Figure 1:
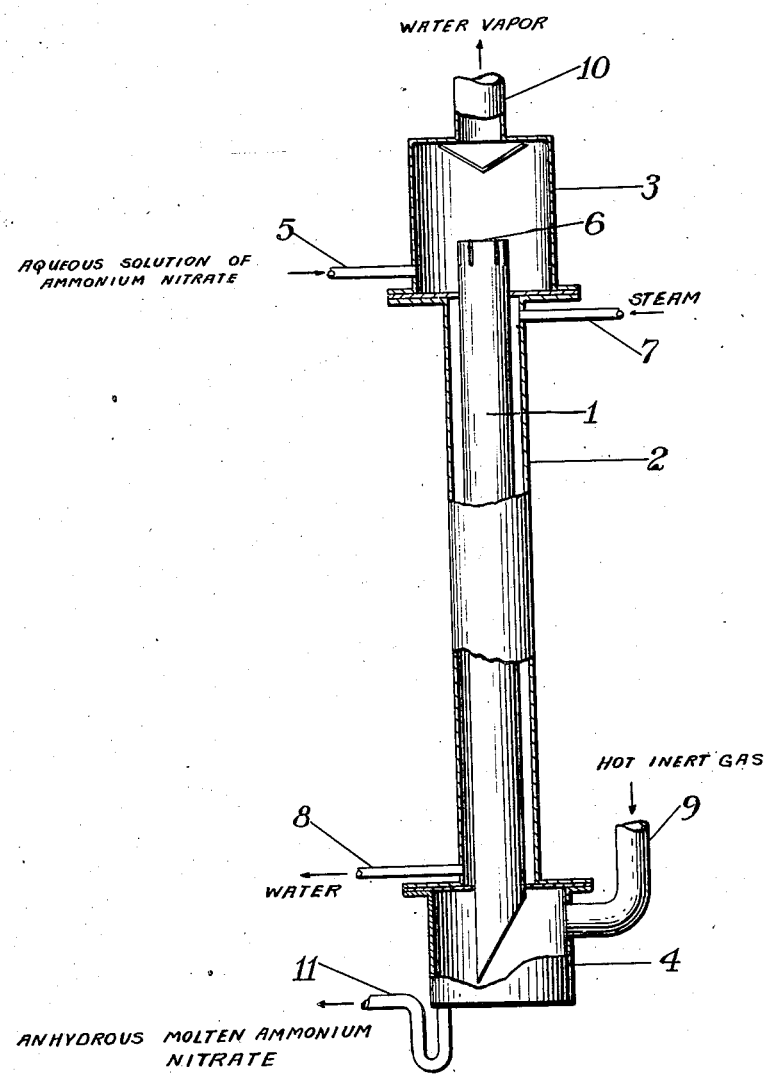

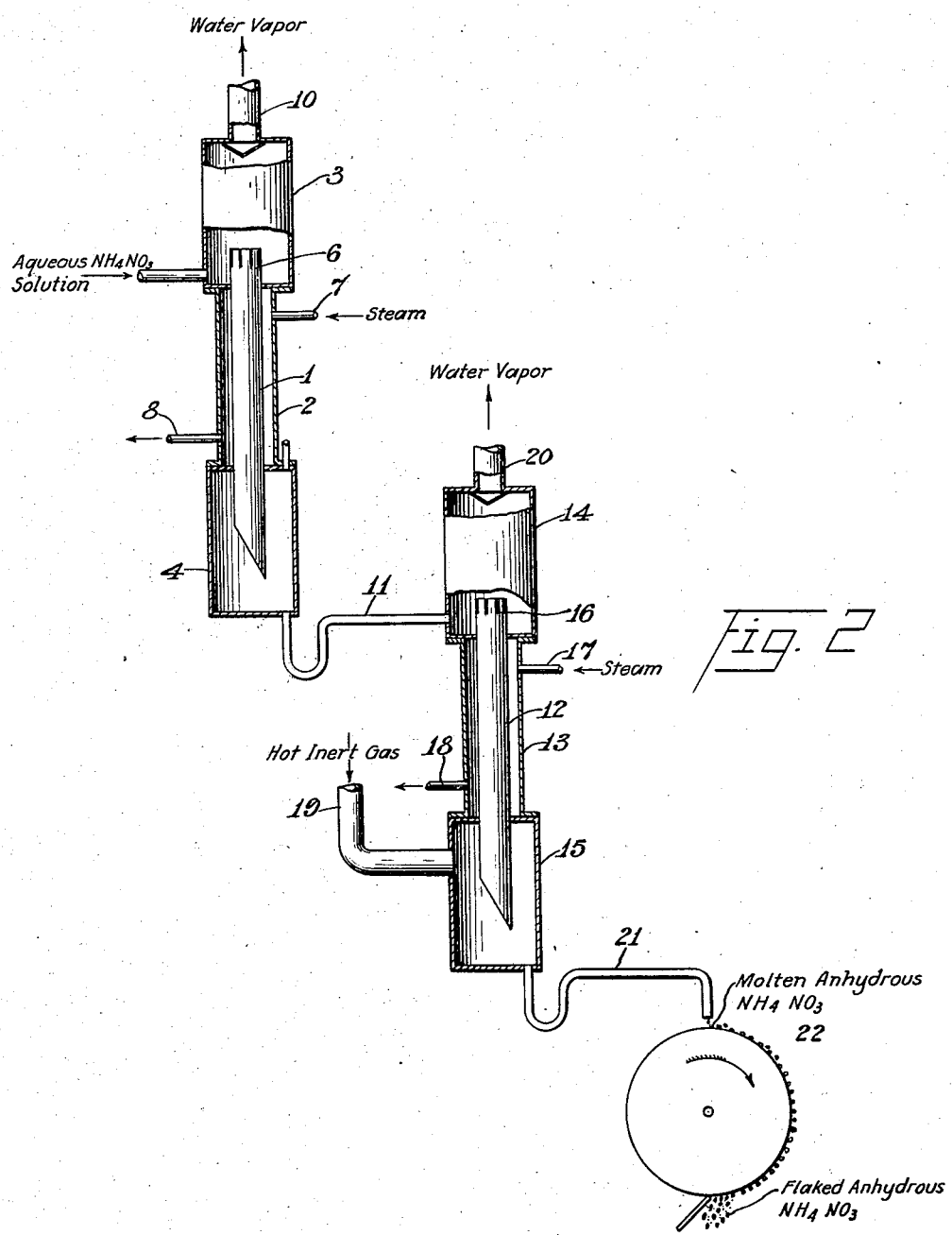

Patented Aug. 17, 1937

2,089,945

UNITED STATES PATENT OFFICE 2,089,945

PROCESS OF PRODUCING AMMONIUM NITRATE AND OTHER FUSIBLE COMPOUNDS

John D. Converse, Shawinigan Falls, Quebec, Canada, Stanley L. Handforth, Gordon Heights, Del., and George J. Harris, Mount Royal, Quebec, Canada, assignors to E. I. du Pont de Nemours & Company, Wilmington, Del., a corporation of Delaware Application February 6, 1934, Serial No. 709,968

19 Claims. (Cl. 23—103)

This invention relates to a process for the production of substantially dry, molten compounds from solutions of said compounds in volatilizable solvents, with the removal of the solvent by evaporation, and more particularly to the production of ammonium nitrate of relatively low water content from its aqueous solutions.

Up to the present time, ammonium nitrate has been recovered from water solutions by one of two processes. By the first of these, the solution is evaporated to a medium water content and then cooled. The ammonium nitrate crystallized in this way, is separated, and dried. The recovered mother liquor is further evaporated and put through the same cycle. This procedure is wasteful of heat and also requires considerable equipment.

The second method consists in evaporating to a relatively low water content, for example, 2 to 10%, which is really a solution of water in molten ammonium nitrate. This molten mass is then cooled with agitation so as to obtain a grained product. It is thus necessary to evaporate the remaining water from the resultant product at a lower temperature so as to obtain an essentially dry ammonium nitrate. The boiling point of fused ammonium nitrate with 10% water is 147° C., while with 5% water, it is 169° C. Hence, in order to evaporate to this low water content, it has been necessary to hold large quantities of molten ammonium nitrate at a high temperature for a considerable length of time, and, even under these conditions, it is practically impossible to evaporate such a material to as low a water content as is desired. Moreover at these temperatures ammonium nitrate decomposes, so that there is loss of valuable material. In addition, ammonium nitrate so processed and containing only small amounts of water will cause any organic material coming into contact with it to burn with almost explosive violence.

There is, therefore, great danger under certain conditions of the whole mass of ammonium nitrate exploding, which creates a serious hazard when any large body of it is so treated. Furthermore, when solutions containing as much as 5% moisture are cast or flaked, the high moisture content causes the product to become porous and to disintegrate on storage.

An object of our invention is a process for the production of substantially dry, molten chemical compounds from solutions of such compounds in volatilizable solvents, where the removal of the solvent is brought about more efficiently and more satisfactorily than has been the case heretofore. A further object is such a process in which ammonium nitrate of much lower water content than is now practical is produced from aqueous solutions of this salt. A still further object is a process for producing fused ammonium nitrate, in which the evaporation of large amounts of ammonium nitrate solution in one body is unnecessary. An additional object is such a process in which the hazards present in previous methods are avoided. Further objects will be disclosed as the invention is more fully described hereinafter.

We have found that the foregoing objects are attained and the production of the substantially dry, molten compound desired is brought about by causing the solution of said compound in a volatilizable solvent to flow at a rapid rate, in the form of a thin layer or film over a heated surface, whereby the evaporation of the water present is substantially complete. While our process is applicable to various solid chemical compounds, it is desirable that the material have a fusion point without decomposition sufficiently low so that it will be in a molten condition, even after the removal of the greater part of the solvent. The invention has particular application to the production of substantially dry, ammonium nitrate from its aqueous solutions.

In the latter case, the solution of ammonium nitrate is passed at a high velocity, in the form of a thin film, over a heated surface. In this way, since a minimum of material is exposed to the necessary elevated temperature for only a very short time, the amount of decomposition is negligible. Also, under these conditions evaporation is essentially a surface process instead of a normal boiling. As a result, there is a minimum amount of spray which can be carried away with the water vapor and lost. We have also found it advantageous when an extremely low water content is desired, to pass a rapid stream of hot inert gas, such as heated air, countercurrent to the film flowing rapidly over the heated surface. In this way, the water vapor is continuously removed and evaporation occurs at a temperature substantially below the normal boiling point. By such a process, a material is obtained having an ammonium nitrate content of not less than 98%.

For example, ammonium nitrate solutions, as ordinarily made by the neutralization of ammonia with nitric acid, usually contain from 10 to 50% water. Such a solution is caused to flow down the inside of a vertical pipe in the form of a thin film, while steam at 150 lbs. pressure, that is with a temperature of 185° C., surrounds the outside of the tube. As a result, water evaporates from the rapidly flowing film and leaves the top of the tube, while the molten ammonium nitrate, containing 2 to 10% water, is withdrawn from the bottom of the tube without the occurrence of any loss of material, due to decomposition or to entrainment. If it is desired to remove still further amounts of water, this molten material may, with advantage, be passed through a second similar tube, up which a rapid current of heated inert gas, such as air, is blown. If the initial concentration is high enough, the complete evaporation may be carried out in one stage by the use of a current of gas up through the tube. By this means, it is possible to reduce the water content to even less than 0.5% and obtain a molten ammonium nitrate with a freezing point higher than 160° C. and at a temperature of about 180° C. This may be done with a heating medium no hotter than 185° C., even though it is practically impossible to reduce a fused ammonium nitrate to so low a water content by the ordinary evaporating means, heretofore available, since the boiling temperature is so high that there is almost complete decomposition.

With the above procedure, when evaporating to extremely low water contents, there may be a slight volatilization of ammonium nitrate and some loss. Under such conditions, we have found that, by introducing even a trace of ammonia gas into the heated air, which is flowing countercurrent to the film of molten nitrate, this loss may be almost completely prevented, even when evaporating to as low a water content as 0.2%. Preferably the ammonia content of the air current should be not greater than 1%.

Ammonium nitrate is customarily produced on a commercial scale by the neutralization of aqueous nitric acid with ammonia either as a gas or in aqueous solution and the subsequent removal of the water from the solution by evaporation. The reaction of ammonia with nitric acid is exothermic and produces a large amount of heat. This heat of neutralization has been utilized in a number of recent processes for the preliminary concentration of the ammonium nitrate solution. It may also, if desired, be used for bringing about the volatilization of the water from the film of ammonium nitrate solution flowing over the heated surface. In this case the heated surface will be located concentrically within the neutralizer, preferably as an overflow pipe, and heated by the hot reacting products surrounding it. In this event, we prefer to operate the reaction on the alkaline side, the excess ammonia being recovered and returned to the process.

An apparatus suitable for carrying out our invention is illustrated in the accompanying drawings, in which 1 is a vertical tube surrounded by a jacket 2. In communication with this tube chambers 3 and 4 are provided at the top and bottom respectively. Ammonium nitrate enters 3 through inlet pipe 5, rises in this chamber and overflows into the top of pipe 1 through slots 6. From these, which serve as distributors, the solution flows in an even film down the inside of pipe 1. Steam enters the outer jacket through inlet 7 and the condensate leaves by outlet pipe 8. Hot air, which enters the bottom chamber 4 through pipe 9, is forced up through tube 1 countercurrent to the film of solution flowing down over the inner surface of the tube, and leaves the top chamber 3 by pipe 10, along with the water vapor driven off from the ammonium nitrate solution by its contact with the hot surface. The molten ammonium nitrate leaves chamber 4 through pipe 11, for cooling and solidification in any form desired. As previously described, the complete operation may be carried out in one step, as shown in Figure 1, or two such evaporators in series may be provided as shown in Figure 2, through the first of which no air is blown, so that pipe 9 is omitted. In this case the effluent from pipe 11 of the first evaporator enters a second stage, similar to that shown in the Figure 1, in which a stream of inert gas is used to drive out the last of the water. In other respects, this second stage is a duplicate of the first stage. Thus, 12 is a vertical tube with jacket 13, and chambers 14 and 15 at the top and bottom respectively. Ammonium nitrate enters the chamber 14 through pipe 11 and overflows into the pipe 12 through slots 16, passing in an even film down the inside of pipe 12. Steam enters the outer jacket through inlet 17 and the condensate leaves by outlet pipe 18. Any suitable hot inert gas such as air is introduced into chamber 15 through pipe 19. Water vapor is driven off from the top of pipe 12. The molten ammonium nitrate leaves chamber 15 through pipe 21 from which it passes to the chilled revolving roller 22 and solidifies thereon, and from which it is readily removed in flaked anhydrous form.

While the evaporator described in the foregoing consists of a heated tube, it should be understood that other forms of apparatus may be employed. For example, a number of tubes may be placed in one heating jacket, or flat plates or sloping surfaces and the like may be used.

The fused ammonium nitrate, resulting from the process described heretofore, can be solidified in any form desired. It may, for example, be poured into molds and solidified in cast forms, or it may be picked up on a chilled rotating roll and when cooled scraped off as flakes, or it may be sprayed to form granules. In any case, the low water content will prevent either a caking or a disintegration of the final solid. With the product of ammonium nitrate solutions, evaporated in the ordinary way and containing as much as 2% water, the high moisture content would cause the masses to become porous, to stick together, or to disintegrate.

An advantage of the cast product over forms of ammonium nitrate previously available lies in its high apparent density, over 1.5, and practically equivalent to the absolute density. As a result of this high density, the material will not float in a molten ammonium nitrate bath, a property that makes this cast product especially valuable for some particular uses of ammonium nitrate, for example in the manufacture of nitrous oxide.

While we have described our invention for the production of a substantially dry product from a solution of said product in a volatilizable solvent in connection with ammonium nitrate particularly, it will be apparent that this process of concentrating a solution to obtain a dry product, by the passing of a film of such solution over a heated surface is applicable with advantage to many other products, both inorganic and organic. Among the inorganic compounds, to the preparation of which the process is applicable, may be cited ammonium acetate, sodium acetate (NaC₂H₃O₂—3 H₂O), and sodium sulfite. Similarly the method may be applied to organic compounds, for example to the evaporation of urea and sugar solutions, the concentration of tartaric acid preliminary to crystallization, and in many other cases. It is apparent that our invention is equally applicable to processes in which either water or other volatilizable solvents are employed.

We intend, therefore, to be limited only as indicated in the following patent claims:

We claim:

1. The process of producing a substantially dry molten compound which has a tendency to decompose when maintained above its melting point, which process comprises causing a solution containing said compound and a volatile fluid to flow in the form of a continuously moving film over a surface maintained at a temperature above the melting point of the compound in the anhydrous state and maintaining the rate of flow sufficiently rapid and the time of contact of the film with the heated surface sufficiently short to substantially avoid decomposition of the compound, but sufficiently long to substantially dehydrate said compound.

2. The process of producing a substantially dry molten compound melting at a temperature attainable with superheated steam, which comprises causing a solution containing said compound and water to flow in the form of a continuously moving film over a surface maintained at a temperature above the melting point of the compound in the anhydrous state and maintaining the rate of flow sufficiently rapid and the time of contact of the film with the heated surface sufficiently short to substantially avoid decomposition of the compound, but sufficiently long to substantially dehydrate said compound.

3. The process of producing a substantially dry molten compound which has a tendency to decompose when maintained above its melting point, which process comprises causing a solution containing said compound and a volatile fluid to flow in the form of a continuously moving film over a heated surface countercurrent to a stream of heated inert gas while maintaining said surface at a temperature above the melting point of the compound in the anhydrous state and maintaining the rate of flow sufficiently rapid and the contact of the film with the heated surface sufficiently short to avoid decomposition of the compound, but sufficiently long to substantially dehydrate said compound.

4. The process of producing substantially dry ammonium nitrate in fused form which comprises causing an aqueous solution of the ammonium nitrate to flow in the form of a continuously moving film over a heated surface maintained at a temperature above the melting point of the ammonium nitrate in the anhydrous state and maintaining the rate of flow sufficiently rapid and the time of contact of the film with the heated surface sufficiently short to substantially avoid decomposition of the ammonium nitrate while removing the water therefrom.

5. The process of producing molten ammonium nitrate of relatively low water content which comprises causing a concentrated aqueous solution of the ammonium nitrate to flow in the form of a continuously moving film over a surface maintained at a temperature sufficiently above the melting point of substantially anhydrous ammonium nitrate to remove by volatilization a substantial part of the water present, maintaining the rate of flow sufficiently rapid and the time of contact of the film with the heated surface sufficiently short to substantially avoid decomposition of the compound and maintaining the molten ammonium nitrate in substantially anhydrous form as it leaves the heated surface.

6. The process of producing ammonium nitrate which comprises causing a concentrated aqueous solution of the ammonium nitrate to flow in the form of a continuously moving film over a heated surface maintained at a temperature sufficiently above the melting point of substantially anhydrous ammonium nitrate, whereby to remove sufficient of the water present to obtain a final molten product having an ammonium nitrate content of not less than 98%, and maintaining the ammonium nitrate in molten form as it leaves the heated surface.

7. The process of producing molten ammonium nitrate which comprises causing a concentrated solution of ammonium nitrate to flow in the form of a continuously moving film over a heated surface maintained at a temperature above the melting point of the salt in the anhydrous state and maintaining the rate of flow sufficiently rapid and the time of contact of the film with the heated surface sufficiently short to substantially avoid decomposition of the ammonium nitrate but sufficiently long to remove by volatilization the greater part of the water present, and flowing the molten ammonium nitrate from the heated surface.

8. The process of producing ammonium nitrate of relatively low water content which comprises causing an aqueous solution of the ammonium nitrate to flow in the form of a continuously moving film over a heated surface maintained at a temperature above the melting point of substantially anhydrous ammonium nitrate, countercurrent to a stream of inert gas and recovering molten ammonium nitrate substantially free from water as it leaves the heated surface.

9. The process of producing ammonium nitrate which comprises causing an aqueous ammonium nitrate solution to flow in the form of a continuously moving film over a heated surface maintained at a temperature above the melting point of substantially anhydrous ammonium nitrate, countercurrent to a stream of hot inert gas, removing sufficient of the water present to obtain a final product having an ammonium nitrate content of not less than 98% and recovering the ammonium nitrate in molten form as it leaves the heated surface.

10. The process of producing ammonium nitrate of relatively low water content which comprises causing a concentrated aqueous solution of ammonium nitrate to flow in the form of a continuously moving film over a surface maintained at a temperature above the melting point of substantially anhydrous ammonium nitrate countercurrent to a stream of hot inert gases to effect the removal of a substantial part of the water present, and maintaining a small ammonia content in said gases.

11. The process of producing ammonium nitrate of relatively low water content which comprises causing an aqueous solution of the ammonium nitrate to flow in the form of a continuously moving film over a heated surface for the partial evaporation of the water present, and then passing the resulting solution, in the form of a film, at a rapid rate over a second heated surface maintained at a temperature above the melting point of substantially anhydrous ammonium nitrate, countercurrent to a stream of heated inert gas to remove a further portion of the water content.

12. The process according to claim 11 in which the heated inert gas has an ammonia content not greater than 1%.

13. The process of producing solidified ammonium nitrate which comprises causing an aqueous solution of the ammonium nitrate to flow in the form of a film over a heated surface maintained at a temperature above the melting point of substantially anhydrous ammonium nitrate, countercurrent to a stream of hot inert gas to evaporate a substantial part of the water present, flowing the molten ammonium nitrate away from the surface and converting the resulting product into a predetermined form and cooling it to a solid in such form.

14. The process according to claim 13 in which the molten ammonium nitrate flows into a mold and is solidified in predetermined cast form.

15. The process according to claim 13 in which the molten ammonium nitrate is chilled to solidification on the surface of a revolving roll and the solid film is scraped off in the form of a flaked product.

16. A process for producing substantially dry ammonium nitrate in fused form, which comprises rapidly flowing a concentrated aqueous solution of said ammonium nitrate, in the form of a film, over a surface heated to a temperature above the melting point of substantially anhydrous ammonium nitrate, and of sufficient length to provide for removal of substantially all water from said ammonium nitrate and the fusion under heat of the ammonium nitrate, and flowing the fused ammonium nitrate from said surface in molten and substantially anhydrous form.

17. The process of producing a substantially solvent-free molten compound, which process comprises causing a solution containing a volatile solvent and a substantially non-volatile compound which melts in the pure state below its decomposition temperature, to flow in the form of a continuously moving film over a surface maintained at a temperature above the melting point of said compound in the solvent-free state, but below the decomposition temperature of said compound, maintaining the rate of flow sufficiently rapid, and the time of contact of the film with the heated surface sufficiently short to substantially avoid decomposition of said compound, but sufficiently long to substantially completely remove said volatile solvent from said compound, and causing the substantially solvent-free compound to flow from said heated surface in a molten condition.

18. The process of producing a substantially anhydrous molten compound which comprises causing an aqueous solution containing a substantially non-volatile compound which melts in the anhydrous state below its decomposition temperature, to flow in the form of a continuously moving film over a surface maintained at a temperature above the melting point of said compound in the anhydrous state, but below its decomposition temperature, maintaining the rate of flow sufficiently rapid and the time of contact of the film with the heated surface sufficiently short to substantially avoid decomposition of said compound, but sufficiently long to substantially dehydrate said compound, and causing the substantially anhydrous compound to flow from said heated surface in a molten condition.

19. The process of producing a substantially anhydrous molten compound, which process comprises causing an aqueous solution of a substantially non-volatile compound which melts in the anhydrous state below its decomposition temperature, to flow in the form of a continuously moving film over a surface maintained at a temperature above the melting point of said compound in the anhydrous state, but below the decomposition temperature thereof, countercurrent to a stream of hot inert gas, maintaining the rate of flow substantially rapid and the time of contact of the film with the heated surface sufficiently short to substantially avoid decomposition of said compound, but sufficiently long to substantially dehydrate said compound, and causing the compound to flow from said heated surface in a molten, substantially anhydrous condition.

JOHN D. CONVERSE.
STANLEY L. HANDFORTH.
GEORGE J. HARRIS.